March 12, 1935.　　C. E. JOHNSON　　1,993,996

SELF LOCKING VALVE TAPPET

Filed Aug. 30, 1932

Inventor
Charles E. Johnson
By Liverance and
Van Antwerp
Attorneys

Patented Mar. 12, 1935

1,993,996

UNITED STATES PATENT OFFICE 1,993,996

SELF LOCKING VALVE TAPPET

Charles E. Johnson, North Muskegon, Mich.

Application August 30, 1932, Serial No. 631,057

1 Claim. (Cl. 151—31)

This invention relates to valve tappets and is directed to a particularly simple and practical tappet which may be adjusted longitudinally and which is self-retained in any position to which it may be adjusted against movement of the parts of the tappet with respect to each other, so that the common and usual lock nut securing and locking means previously used in valve tappets, which are mechanically adjusted, may be dispensed with. All of the detrimental effects of utilizing a lock nut are eliminated, such as any distortion and change in adjustment of the tappet with respect to the valve stem of the valve with which it is associated, and an adjustable valve tappet produced which is quickly and easily adjusted, remains in adjusted position, and the adjustment is accomplished without troubling or disturbing the same after it has once been accomplished.

Valve tappets, which lift the valves of internal combustion engines and which are disposed between the valve stems and the cam shafts of such engines, require adjustment from time to time as the valves or valve seats become worn or are ground periodically. The adjustment is done when the engine is relatively cool, and by reason of the fact that the tappet will expand lengthwise when the engine becomes hot, it is necessary in the adjustment to space the upper end of the tappet a short distance from the lower end of the valve stem in order that on longitudinal expansion of the tappet, and also of the valve stem, the valve will not be lifted from its seat a small amount of the times when it should be firmly engaged against its seat. Thin feeler gauges are used for this purpose and interposed between the upper end of the tappet and the lower end of the valve stem and the valve tappet adjusted with respect to said gauge.

With my invention the adjustment of the valve tappet, when once accomplished, requires nothing further in the way of locking or securing its parts against change of position, as has been required before in manually or mechanically adjusted tappets, and the usual lock nut previously used for such locking purpose is entirely done away with. The use of a lock nut disturbs the adjustment in many instances, or if it is not securely set, the valve tappet is quite liable to get out of adjustment due to loosening of the lock nut. The problem of properly adjusting the valve tappets of a multiple cylinder engine is one which has heretofore required very high skill. With my invention the adjustment is accomplished very readily and easily and the danger of upsetting the adjustment which has been made is entirely removed with the elimination of the lock nut securing means previously used.

It is a primary object and purpose of the present invention to provide a simple self contained structure of valve tappet substantially self locking at any position to which it is adjusted and sufficiently locking that the parts of the tappet will not move relatively to each other under any of the conditions of service to which the tappet is subjected when used with an engine.

An understanding of the invention may be had from the following description, taken in connection with the accompanying drawing, in which, Fig. 1 is a fragmentary section and side elevation illustrating the use and application of the valve tappet of my invention to an internal combustion engine.

Like reference characters refer to like parts in the different figures of the drawing.

Figure 1:
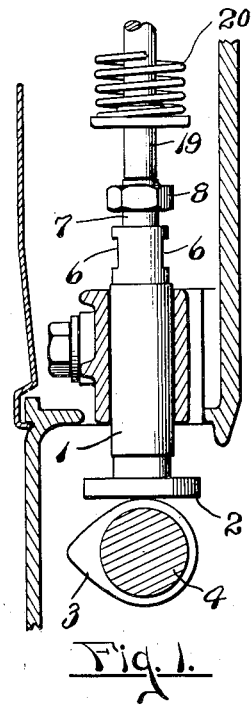

The tappet comprises a lower member including a vertical substantially cylindrical body 1, having a head 2 at its lower end provided with a horizontal hardened under surface to ride against a cam 3 on the cam shaft 4 of an internal combustion engine. Near the upper end of the body the opposite sides thereof are flattened, as indicated at 6, in order that the jaws of a wrench may be engaged with and hold the lower member of the tappet against any rotative movement during the assembly of the parts or the adjustment after installation in the motor. The upper end portion of the body 1 is interiorly bored and threaded as indicated at 5.

An upper member for the tappet consists of a stem 7 extending below and integral with a head 8 which is enlarged and formed that a wrench may be readily applied thereto. The stem 7 at its lower part for nearly its full length is exteriorly threaded, providing a threaded section 9. This section 9 is interiorly bored from its lower end upwardly for a distance, as indicated at 10, and the walls surrounding the opening or recess 10 are slotted at a plurality of points to make slots 11, four of which are shown though the number may be varied.

Within the cylindrical opening 10 in the lower end of the upper tappet member a coiled spring 12 is inserted. This spring has its coils closely contacting and the exterior diameter of the coils is slightly greater than the interior diameter of the cylindrical recess 10. In practice I have found that with a light spring having an exterior diameter greater by five-thousandths of an inch than the interior diameter of the cylindrical opening or recess 10 very satisfactory results are attained. If the spring is of a heavier or stiffer form the excess of its exterior diameter over the interior diameter of the recess 10 should be reduced. The coiled spring is not to be stiff and too unyielding but rather should be of a light and comparatively readily yielding nature.

With the continuous coiled spring 12 located in the recess 10, the threaded section 9 of the upper tappet member may be screwed into the interiorly threaded opening 5 of the body 1. The parts between the slots 11 of the threaded section 9 are forced inwardly against the spring 12 and each coil of the spring must be compressed inwardly because of the larger exterior diameter of the spring coils. Such inward compression of the various coils is heavily resisted by said coils with the result that the sections of the threaded part 9 between the slots 11 are held outwardly with considerable force and pressure against the interiorly threaded recess 5 of the body 1, and the movement inwardly or outwardly of the upper member of the tappet is accomplished only by the exertion of a considerable force upon a wrench supplied to the head 7, it being understood that another wrench supplied to the opposite flattened side 6 of the body 1 is used to hold the body against turning.

The maximum of the resisting force of the coil spring 12 comes after the spring is entirely housed below the upper end of the body 1. This resistance to turning movement insures that after the parts have once become adjusted with respect to each other, they will not accidentally or otherwise change their relative adjusted positions under any of the effects of service in an internal combustion engine; but on the application of wrenches and the securing of the necessary leverage the tappet parts may be longitudinally adjusted when necessary.

Figure 5:
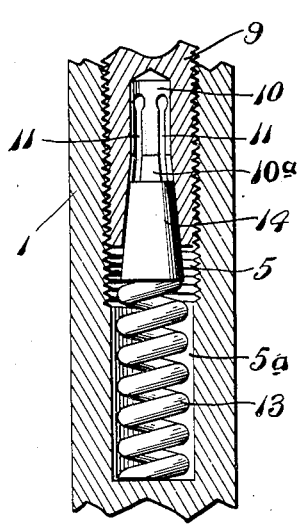
Figs. 5, 6 and 7 are fragmentary vertical sections illustrating other forms or embodiments of the invention, the preferred form being shown in Figs. 2, 3 and 4.

In Fig. 5, below the interiorly threaded recess 5 in a body 1, a plain recess 5a is made and the cylindrical opening or recess 10 in the threaded stem portion 9 is enlarged at its lower end and tapers upwardly as indicated at 10a. A coiled compression spring 13 seats in the recess 5a and a tapered plug 14 at the upper end of said spring enters into and engages the tapered sides 10a so as to spread the slotted lower end portion of the threaded part 9 and provide a secure engagement of the two parts of the tappet which resists any tendency of the same to change position with respect to each other.

Figure 6:
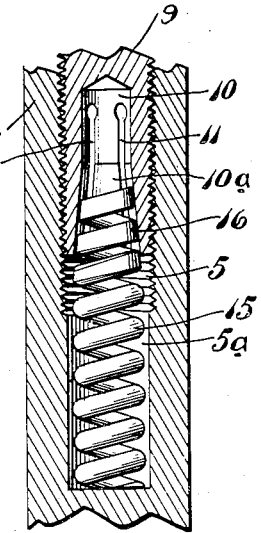

In Fig. 6 the construction is the same as in Fig. 5 except that instead of the tapered plug 14 being used a coiled spring 15, like the spring 14 at its lower part, at its upper end has its coils ground away to provide an upwardly tapering spring section 16 to enter the tapered lower end 10a of the recess 10. This construction would be preferred over that shown in Fig. 5 and with it the same automatic locking of the two parts of the tappet with respect to each other is attained.

Figure 2:
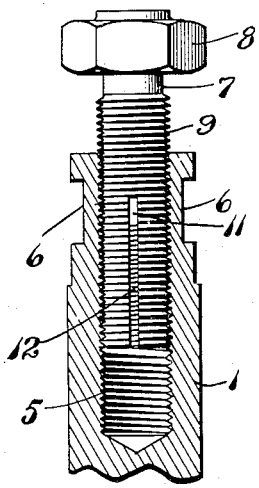
Fig. 2 is a fragmentary enlarged central vertical section through the upper end portion of the valve tappet, the upper member of the tappet being shown in elevation.
Figure 3:
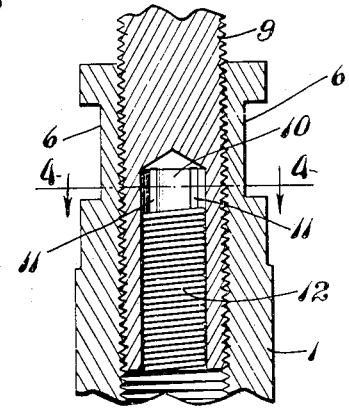
Fig. 3 is an enlarged fragmentary central vertical section through both parts of the valve tappet.
Figure 4:
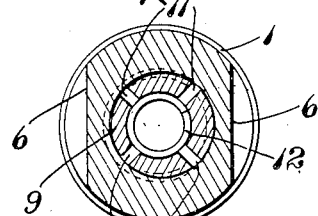
Fig. 4 is a horizontal section on the plane of line 4—4 of Fig. 3.
Figure 7:
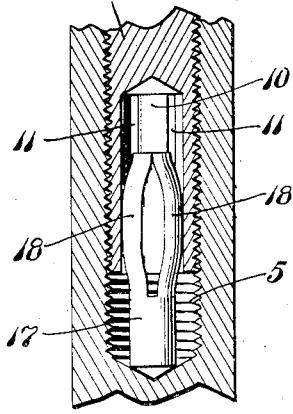

In Fig. 7 the construction of the tappet parts is the same as that disclosed in Figs. 2 and 3. The coiled spring 12 is replaced by a rod 17, the lower end of which bears against the lower end of the threaded recess 5 while its upper portion is divided and the parts 18 spread outwardly to engage against and spread apart the sections between the slots 11 of the upper tappet member. With the screwing of the upper tappet member into the threaded recess 5, the spaced apart sections 18 are forced more and more into the cylindrical recess 10 causing a tighter binding effect between the two adjustable parts of the tappet.

The construction disclosed is of a simple nature, economical to manufacture, very quickly and easily assembled, and exceptionally easy to adjust after it has been installed in an internal combustion engine. It is of course understood that the upper end of the upper member of the tappet has the lower end of a valve stem 19 (Fig. 1) normally engaged thereagainst, the valve (not shown) being held on its seat except when lifted by the rotation of the cam shaft by heavy coil compression spring 20. The adjustment of the inner member of the tappet toward or away from the lower end of the valve stem 19 and the very slight spacing between the two parts when the tappet is adjusted, with the engine cold or at least colder than it is during running conditions, is simply and easily accomplished by engaging two wrenches with the head 8 and the sides 6 and performing the adjustment to a desired degree, after which nothing further needs to be done.

The invention is defined in the appended claim and is to be considered comprehensive of all forms of structure coming within their scope.

I claim:

A mechanism comprising, two members in axial alinement having a longitudinally threaded adjustment with respect to each other, one of said members threading into a longitudinal opening in the other and at its inner end being provided with an axial longitudinal recess of substantially uniform diameter and having longitudinal slots extending from said recess outwardly to the outer sides of said member, and a coiled spring having a plurality of coils located closely together received in said recess, the exterior diameter of the spring being slightly greater than the interior diameter of the recess in which it is located.

CHARLES E. JOHNSON.